US012155128B2

(12) United States Patent
Kalateh et al.

(10) Patent No.: US 12,155,128 B2
(45) Date of Patent: Nov. 26, 2024

(54) ELECTRONICALLY RECONFIGURABLE 1-BIT PHASE QUANTIZATION PHASED ARRAY ELEMENT

(71) Applicant: Wisconsin Alumni Research Foundation, Madison, WI (US)

(72) Inventors: Mohammad Mahdi Honari Kalateh, Middleton, WI (US); Nader Behdad, Oregon, WI (US); John H. Booske, McFarland, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 289 days.

(21) Appl. No.: 17/567,965

(22) Filed: Jan. 4, 2022

(65) Prior Publication Data

US 2023/0216193 A1 Jul. 6, 2023

(51) Int. Cl.
*H01Q 3/46* (2006.01)
*H01Q 15/14* (2006.01)
*H01Q 19/10* (2006.01)

(52) U.S. Cl.
CPC ............ *H01Q 3/46* (2013.01); *H01Q 15/147* (2013.01); *H01Q 19/10* (2013.01)

(58) Field of Classification Search
CPC .......... H01Q 3/44; H01Q 3/46; H01Q 15/147; H01Q 15/148; H01Q 19/10; H01Q 19/104
See application file for complete search history.

(56) References Cited

U.S. PATENT DOCUMENTS 6,081,235 A 6/2000 Romanofsky
6,351,240 B1 2/2002 Karimullah
6,741,207 B1 5/2004 Allison et al.
7,030,824 B1 4/2006 Taft et al.
8,248,302 B2 8/2012 Tsai et al.
9,640,867 B2 5/2017 Behdad et al.
10,090,603 B2 10/2018 Behdad et al.
(Continued)

FOREIGN PATENT DOCUMENTS

CN 116169477 A 5/2023
KR 20230028138 A 2/2023

OTHER PUBLICATIONS

K. Miyaguchi et al., "An ultra-broad-band reflection-type phase-shifter MMIC with series and parallel LC circuits," IEEE Transactions on Microwave Theory and Techniques, vol. 49, No. 12, pp. 2446-2452, Dec. 2001.

*Primary Examiner* — Robert Karacsony
(74) *Attorney, Agent, or Firm* — Bell & Manning, LLC

(57) ABSTRACT

A phase shift element includes an antenna, a first dielectric layer, a ground plane mounted to a first surface of the first dielectric layer, a reflecting circuit, and a single antenna-reflector line connected between the antenna and the reflecting circuit through the ground plane and the first dielectric layer. The antenna-reflector line is formed of a conducting material. The reflecting circuit is mounted to a second surface of the first dielectric layer. The first surface is opposite the second surface. The reflecting circuit is configured to reflect a signal received on the single antenna-reflector line from the antenna back to the antenna on the single antenna-reflector line. The reflecting circuit is further configured to be switchable between two different impedance levels that each provide a different phase shift when the signal is reflected by the reflecting circuit.

19 Claims, 13 Drawing Sheets

(56) References Cited

U.S. PATENT DOCUMENTS

| | | | | |
|---|---|---|---|---|
| 10,749,270 | B2 | 8/2020 | Behdad et al. | |
| 10,862,210 | B2 | 12/2020 | Behdad et al. | |
| 11,205,828 | B2 | 12/2021 | Behdad et al. | |
| 11,239,555 | B2 | 2/2022 | Behdad et al. | |
| 11,973,274 | B2 | 4/2024 | Theofanopoulos | |
| 2006/0109176 | A1 * | 5/2006 | Lee | H01Q 3/46 343/700 MS |
| 2008/0030420 | A1 * | 2/2008 | Lee | H01Q 3/46 343/853 |
| 2009/0027138 | A1 | 1/2009 | Nishino et al. | |
| 2023/0216191 | A1 | 7/2023 | Kalateh | |
| 2023/0216193 | A1 | 7/2023 | Kalateh | |

* cited by examiner

ELECTRONICALLY RECONFIGURABLE 1-BIT PHASE QUANTIZATION PHASED ARRAY ELEMENT

This invention was made with government support under N00014-19-1-2502 awarded by the NAVY/ONR. The government has certain rights in the invention.

BACKGROUND

A phased-array antenna is an array of antennas in which a relative phase of signals feeding each antenna is varied such that an effective radiation pattern of the array is reinforced in a desired direction and suppressed in undesired directions to provide electronic steering of a beam. Electronically tunable reflective array (reflectarray) antennas may be used in designing passive phased-array antennas used in applications ranging from wireless and satellite communications to radar and imaging systems. Reflectarray antennas are typically used to collimate the wave front generated by a low-gain feed antenna. Each unit cell of the reflectarray antenna acts as a spatial phase shifter to scatter the incident wave with a specific phase shift to realize a desired phase profile for the reflected wave over the array's aperture to form a high gain pencil beam at an intended direction. Beams are formed in the intended direction by shifting the phase of the signal emitted from each radiating element to provide either constructive or destructive interference to steer the beam. The direction of the main beam can be electronically steered by adaptively changing the reflection phase of each array element.

Ideally, it is desirable to have the reflectarray antenna's unit cells that can be reconfigured to yield any arbitrary phase shift values between 0° and 360° to provide perfect phase correction. However, the reconfiguration techniques to achieve any arbitrary phase shift values between 0° and 360° require changing the control voltage continuously and individually configuring the unit cells, which results in a relatively sophisticated architecture for voltage supply circuitry. Moreover, it is challenging to realize the full, reconfigurable 0° to 360° phase range over a broad frequency range (e.g., with fractional bandwidth of larger than 10%). Instead of a continuous 0° to 360° phase range, discrete phase correction schemes that quantize this phase range into a number of discrete levels have been widely adopted in order to reduce the complexity of the control circuitry and increase operating bandwidths of beam-steerable reflectarray antennas.

Electronically reconfigurable reflectarray antennas typically use multiple semiconducting devices (e.g., PIN diode switches, varactor diodes, etc.) embedded within the reflectarray unit cell to achieve electronic reconfigurability. In a typical phased-array antenna, hundreds or thousands of unit cells are needed. This increases the number of semiconducting components required for the phased-array aperture, thereby increasing its cost and complexity.

Another challenge of electronically-tunable reflectarray antennas is the limited bandwidth offered by most conventional designs. Typical designs have bandwidths in the order of 10%. In many future wireless applications where significant bandwidth and throughput is required, this narrow bandwidth may be insufficient to meet the demands of the system.

SUMMARY

In an illustrative embodiment, a phase shift element is provided. The phase shift element includes, but is not limited to, an antenna, a first dielectric layer, a ground plane mounted to a first surface of the first dielectric layer, a reflecting circuit, and a single antenna-reflector line connected between the antenna and the reflecting circuit through the ground plane and the first dielectric layer. The antenna-reflector line is formed of a conducting material. The reflecting circuit is mounted to a second surface of the first dielectric layer. The first surface is opposite the second surface. The reflecting circuit is configured to reflect a signal received on the single antenna-reflector line from the antenna back to the antenna on the single antenna-reflector line. The reflecting circuit is further configured to be switchable between two different impedance levels that each provide a different phase shift when the signal is reflected by the reflecting circuit.

In another illustrative embodiment, a phased array antenna is provided. The phased array antenna includes, but is not limited to, a plurality of phase shift elements.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
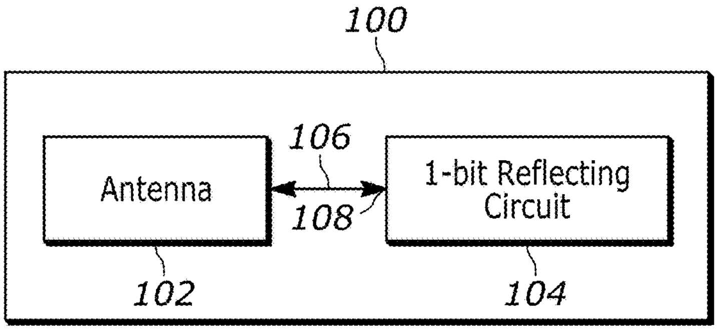
FIG. 1 depicts a block diagram of a 1-bit phase shift element in accordance with an illustrative embodiment.

Referring to FIG. 1, a 1-bit phase shift element 100 is shown in accordance with an illustrative embodiment. 1-bit phase shift element 100 may include an antenna 102 and a reflecting circuit 104. Antenna 102 and reflecting circuit 104 may be connected using an antenna-reflector line 106 that connects to reflecting circuit 104 at an input/output (I/O) port 108 of reflecting circuit 104. A signal may be received at I/O port 108 from antenna-reflector line 106 that is reflected by reflecting circuit 104 back onto antenna-reflector line 106 such that I/O port 108 provides a port of entry of a received electrical signal and of exit of a reflected electrical signal. Reflecting circuit 104 can be configured to provide two different reflection loads. When antenna 102 is illuminated with an incident electromagnetic wave, a signal that results from the wave is entirely reflected by reflecting circuit 104 with a phase shift that can be adjusted electronically to two different phase shifts, such as 0° and 180°, by controlling a state of a switch of reflecting circuit 104 thereby changing the impedance of reflecting circuit 104.

Antenna 102 can be any type of antenna or radiating element including, but not limited to, a microstrip patch antenna, a slot and aperture-coupled antenna, a monopole antenna, a dipole antenna, or any combination of them. In the illustrative embodiment, antenna 102 is a 1-port antenna though a 2-port antenna, such as an antenna with a differential feed structure, can be used when one of the ports is left open or shorted. Antenna-reflector line 106 may be a wire, a trace, a vertical interconnect access, or any other means of direct electrical connection.

Figure 2:
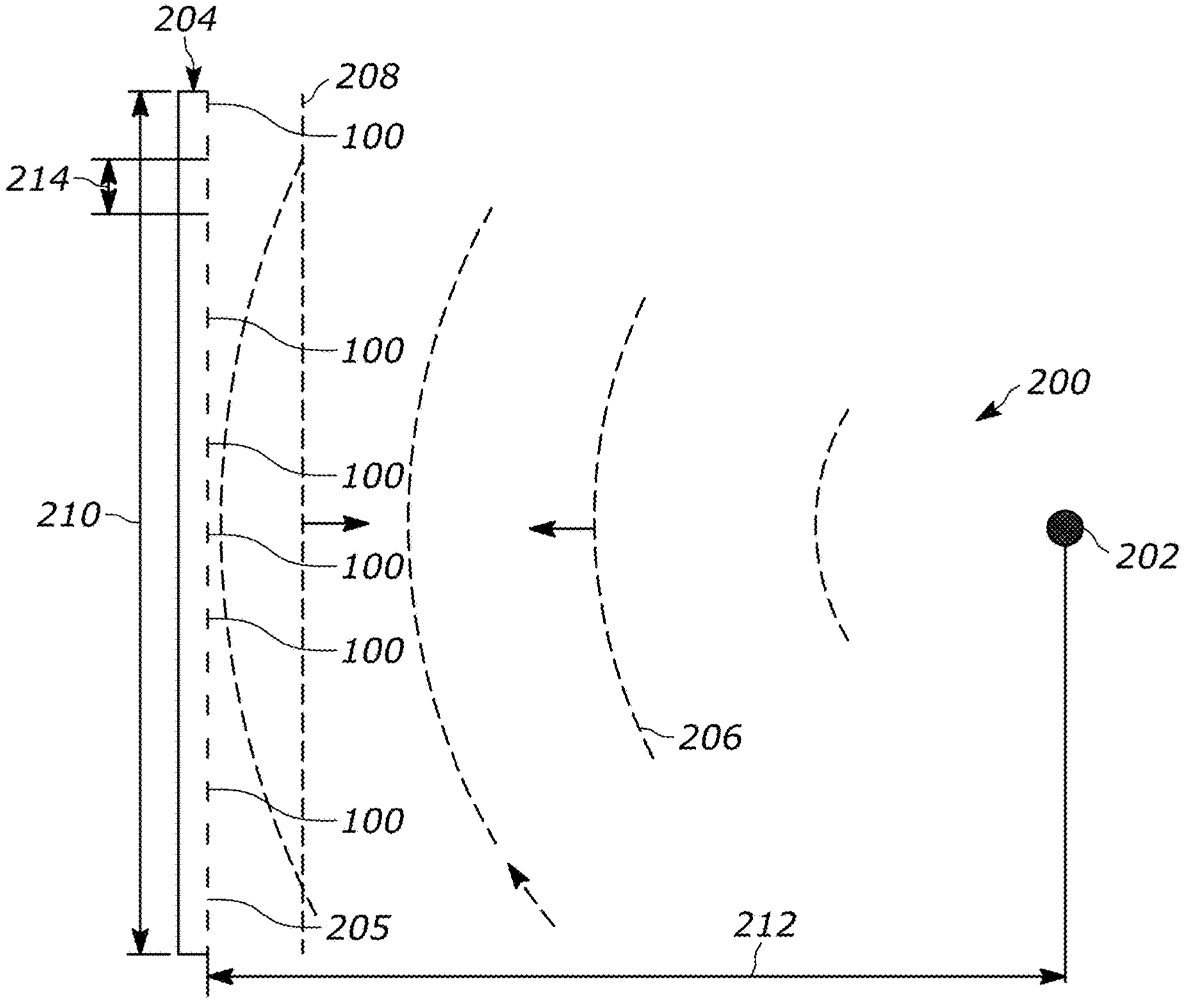
FIG. 2 depicts a side view of a transceiver system that includes a plurality of the 1-bit phase shift elements of FIG. 1 in accordance with an illustrative embodiment.
Figure 3:
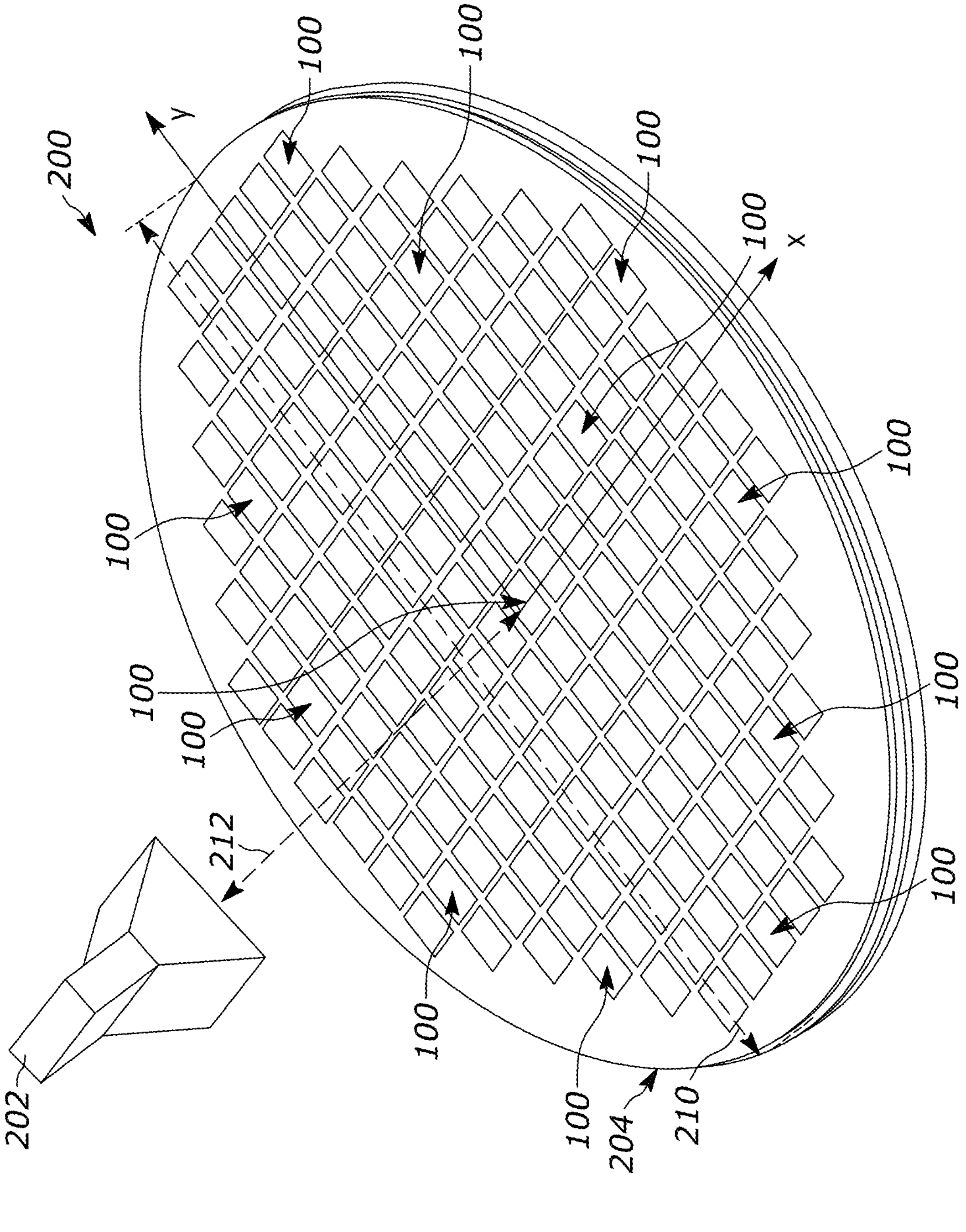
FIG. 3 depicts a perspective view of the transceiver system of FIG. 2 in accordance with an illustrative embodiment.

Referring to FIG. 2, a 1-D side view of a transceiver system 200 is shown in accordance with an illustrative embodiment. Referring to FIG. 3, a perspective view of transceiver system 200 is shown with a circular aperture in accordance with an illustrative embodiment. Transceiver system 200 may include a feed antenna 202 and a plurality of 1-bit phase shift elements. Transceiver system 200 may act as a transmitter or a receiver of analog or digital signals. The plurality of 1-bit phase shift elements is arranged to form a reflectarray antenna 204. Feed antenna 202 may have a low gain. Feed antenna 202 may be a dipole antenna, a monopole antenna, a helical antenna, a microstrip antenna, a patch antenna, a fractal antenna, a feed horn, a slot antenna, an end fire antenna, a parabolic antenna, etc. In the illustrative embodiment of FIG. 3, feed antenna 202 is illustrated as a feed horn and is positioned at a center of reflectarray antenna 204. The plurality of 1-bit phase shift elements are arranged to form a circular 2-D array of 1-bit phase shift elements in the illustrative embodiment.

Feed antenna 202 is positioned a focal distance 212, fa, from a front face 205 of the plurality of 1-bit phase shift elements. Feed antenna 202 is configured to receive an analog or a digital signal, and in response, to radiate a spherical radio wave 206 toward front face 205 of the plurality of 1-bit phase shift elements. For example, front face 205 may include antenna 102 of each 1-bit phase shift element 100. Feed antenna 202 also may be configured to receive spherical radio wave 206 from front face 205 of the plurality of 1-bit phase shift elements and to generate an analog or a digital signal in response.

The plurality of 1-bit phase shift elements may be arranged to form a one-dimensional (1D) or a two-dimensional (2D) array of spatial phase shift elements in any direction. The plurality of 1-bit phase shift elements may form variously shaped apertures including circular, rectangular, square, elliptical, etc. The plurality of 1-bit phase shift elements can include any number of 1-bit phase shift elements. The plurality of 1-bit phase shift elements defines an aperture length 210. A center of each 1-bit phase shift element 100 may be separated a distance 214 from a center of its neighbors in any direction.

Spherical radio wave 206 reaches different portions of front face 205 at different times. The plurality of 1-bit phase shift elements can be considered to be a plurality of pixels each of which act as a 1-bit phase shift unit by providing a selected phase shift within the frequency band of interest. Thus, each 1-bit phase shift element of the plurality of 1-bit phase shift elements acts as a phase shift circuit selected such that spherical radio wave 206 is re-radiated in the form of a planar wave 208 that is parallel to front face 205, or vice versa. Given aperture length 210 and focal distance 212, the phase shift profile provided for the plurality of 1-bit phase shift elements to form planar wave 208 directed to a specific angle can be calculated as understood by a person of skill in the art.

For example, assuming feed antenna 202 is aligned to emit spherical radio wave 206 at the focal point of the plurality of 1-bit phase shift elements, the time it takes for each ray to arrive at front face 205 is determined by a length of each ray trace, i.e., the distance traveled by the electromagnetic wave traveling at the speed of light. A minimum time corresponds to a propagation time of the shortest ray trace, which is the line path from feed antenna 202 to a center of front face 205 for a center positioned feed antenna 202. A maximum time corresponds to a propagation time of the longest ray trace, which is the line path from feed antenna 202 to an edge of front face 205 for the center positioned feed antenna 202. Feed antenna 202 may be positioned at an off-center position with a resulting change in the distribution of ray traces to each 1-bit phase shift element. Of course, because the distance varies between feed antenna 202 and each 1-bit phase shift element of reflectarray antenna 204, a magnitude of the portion of spherical radio wave 206 received by each 1-bit phase shift element also varies.

Reflecting circuit 104 may include a single switch arranged to define a first mode also referred to as a first phase state and a second mode also referred to as a second phase state that each define a distinct phase state of 1-bit phase shift element 100. Reflecting circuit 104 provides 1-bit phase quantization for 1-bit phase shift element 100 by exploiting two distinct reflection modes.

Figure 4:
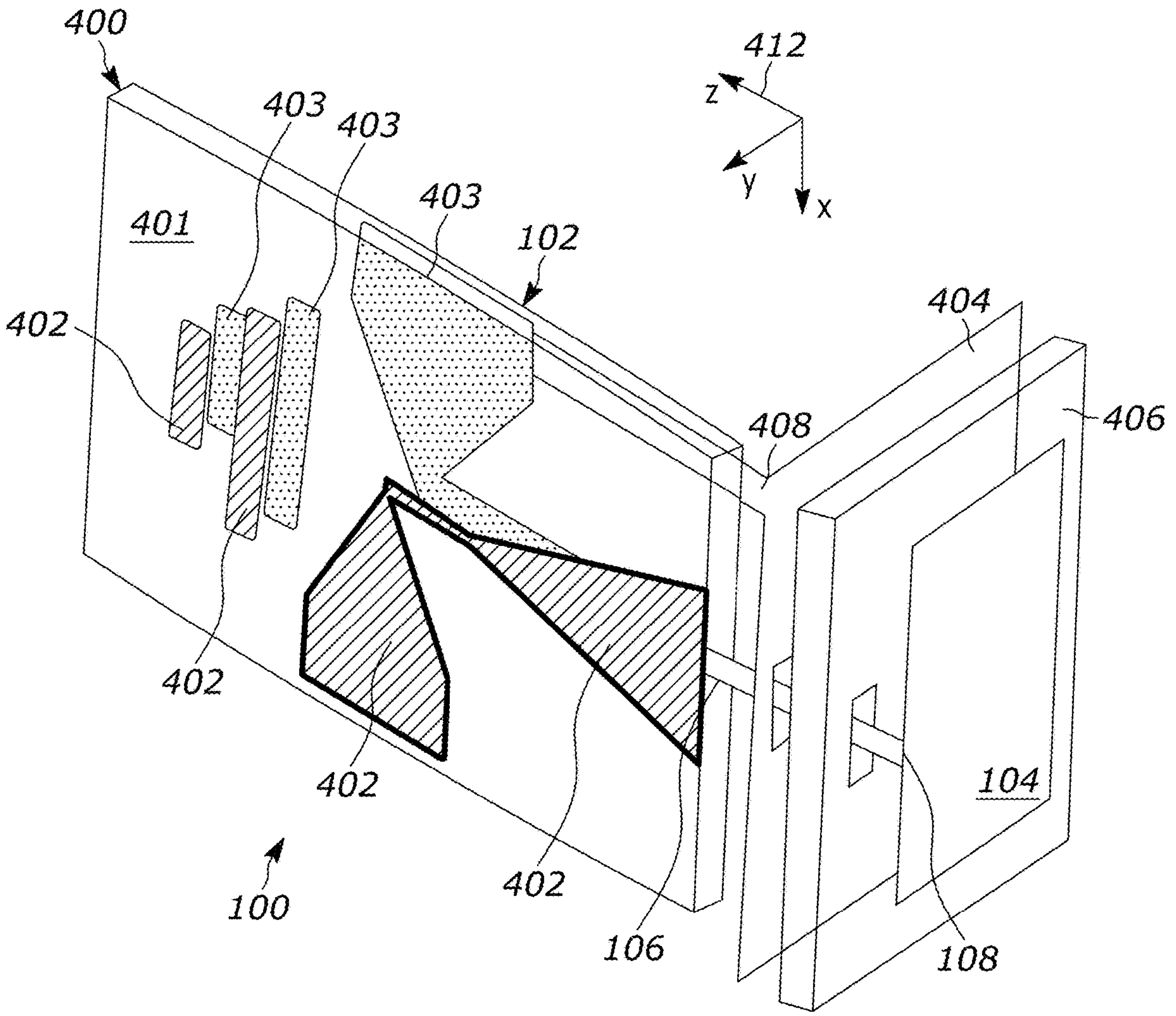
FIG. 4 depicts an exploded, perspective view of the 1-bit phase shift element of FIG. 1 with a dipole antenna in accordance with an illustrative embodiment.

Referring to FIG. 4, an exploded perspective view of a 1-bit phase shift element 100 is shown in accordance with an illustrative embodiment. 1-bit phase shift element 100 may include antenna 102 connected to reflecting circuit 104. In the illustrative embodiment, antenna 102 is implemented as a dipole antenna that includes an antenna dielectric layer 400, a first conducting pattern layer 402, and a second conducting pattern layer 403. Dimensions of antenna 102 may be selected based on a frequency of operation selected for transceiver system 200. Reflecting circuit 104 is mounted on a reflector dielectric layer 406.

Figure 5A:
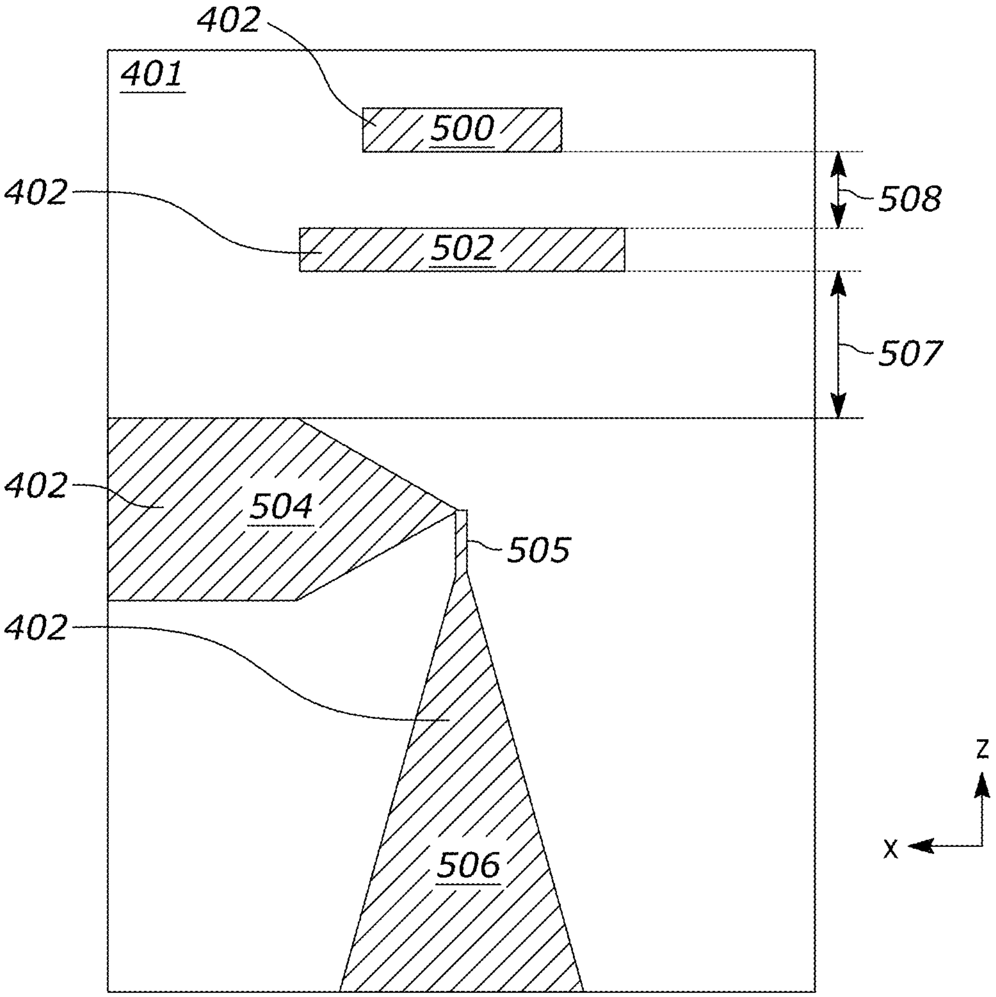
FIG. 5A depicts a first conducting layer of the dipole antenna of FIG. 4 on a dielectric layer in accordance with an illustrative embodiment.
Figure 5B:
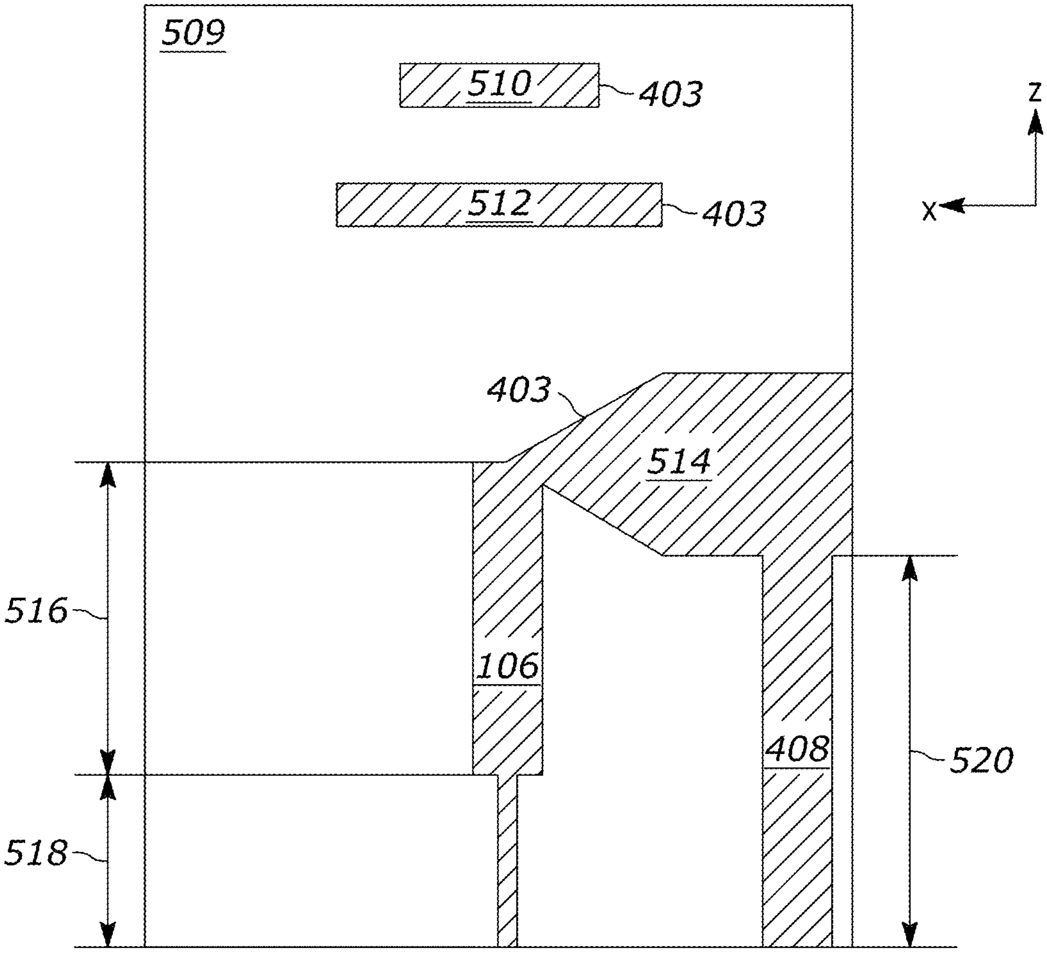
FIG. 5B depicts a second conducting layer of the dipole antenna of FIG. 4 on the dielectric layer in accordance with an illustrative embodiment.

Referring to FIG. 5A, a first face 401 of antenna dielectric layer 400 is shown in accordance with an illustrative embodiment. Referring to FIG. 5B, a second face 509 of antenna dielectric layer 400 is shown in accordance with an illustrative embodiment. Second face 509 is on an opposite side of antenna dielectric layer 400 relative to first face 401. The first face and the second face of antenna dielectric layer 400 are parallel to the x-z plane of an x-y-z frame 412. First conducting pattern layer 402 is mounted to first face 401 of antenna dielectric layer 400. Second conducting pattern layer 403 is mounted to second face 509 of antenna dielectric layer 400.

Antenna dielectric layer 400 may have a planar rectangular, circular, triangular, or other polygonal or elliptical shape. Antenna dielectric layer 400 is formed of one or more dielectric materials that may include foamed polyethylene, solid polyethylene, polyethylene foam, polytetrafluoroethylene, air, air space polyethylene, vacuum, etc. An illustrative dielectric material is a 5880 laminate sold by Rogers Corporation headquartered in Chandler, Arizona, USA.

Ground plane 404 may have a planar rectangular, circular, triangular, or other polygonal or elliptical shape. Ground plane 404 may be formed of a sheet of conductive material such as copper plated steel, silver plated steel, silver plated copper, silver plated copper clad steel, copper, copper clad aluminum, steel, etc. Ground plane 404 is a conducting surface that provides a fixed potential that may be, but is not necessarily, a ground potential. Ground plane 404 may be generally flat or formed of ridges or bumps. For illustration, ground plane 404 may be formed of a flexible membrane coated with a conductor.

Reflector dielectric layer 406 may have a planar rectangular, circular, triangular, or other polygonal or elliptical shape with dimensions that are similar to ground plane 404. Reflector dielectric layer 406 is formed of one or more dielectric materials that may include foamed polyethylene, solid polyethylene, polyethylene foam, polytetrafluoroethylene, air, air space polyethylene, vacuum, etc. An illustrative dielectric material is a 5880 laminate sold by Rogers Corporation headquartered in Chandler, Arizona, USA. Antenna dielectric layer 400 and reflector dielectric layer 406 may be formed of the same or different dielectric materials and the same or a different number of layers of dielectric material.

In the illustrative embodiment, each of antenna dielectric layer 400, ground plane 404, and reflector dielectric layer 406 has a generally square or rectangular shape. The top and bottom surfaces of antenna dielectric layer 400 are defined in an x-z plane, where an x-axis is perpendicular to a y-axis, and both the x-axis and the y-axis are perpendicular to the z-axis to form a right-handed coordinate 3-dimensional (D) reference frame denoted x-y-z frame 412. Antenna dielectric layer 400 has a depth that is parallel to the y-axis of x-y-z frame 412. In the illustrative embodiment, the top and bottom surfaces of ground plane 404 and reflector dielectric layer 406 are defined in an x-y plane of x-y-z frame 412. Ground plane 404 and reflector dielectric layer 406 have a depths that are parallel to the z-axis of x-y-z frame 412.

First conducting pattern layer 402 and second conducting pattern layer 403 may be formed of a conductive material such as copper plated steel, silver plated steel, silver plated copper, silver plated copper clad steel, copper, copper clad aluminum, steel, etc. First conducting pattern layer 402 and second conducting pattern layer 403 may be generally flat or formed of ridges or bumps. For illustration, first conducting pattern layer 402 and second conducting pattern layer 403 may be formed of a flexible membrane coated with a conductor. First conducting pattern layer 402 and second conducting pattern layer 403 may be formed of the same or different conductive materials.

In the illustrative embodiment, first conducting pattern layer 402 may include a first short bar segment 500, a first long bar segment 502, a first pentagon segment 504, a channel segment 505, and a triangle segment 506. First long bar segment 502 has a longer length in a length direction than first short bar segment 500 with a similar width in a width direction. The length direction is parallel to the x-axis of the x-y-z frame 412, and the width direction is parallel to the z-axis of the x-y-z frame 412. First long bar segment 502 and first short bar segment 500 extend parallel to each other in the length direction and are separated by a first distance 508 measured parallel to the z-axis of the x-y-z frame 412. First long bar segment 502 is mounted closer to first pentagon segment 504 than first short bar segment 500. First long bar segment 502 is separated from a closest edge of first pentagon segment 504 by a second distance 507 measured parallel to the z-axis of the x-y-z frame 412.

First pentagon segment 504 has a shape described by a convex pentagon with adjacent right angles. A third distance defines a width of first pentagon segment 504 that is measured between the adjacent right angles parallel to the z-axis of the x-y-z frame 412. A peak of first pentagon segment 504 that is opposite a base edge is defined by an isosceles triangle. The base edge of first pentagon segment 504 extends between the adjacent right angles and is mounted near an edge of first face 401 of antenna dielectric layer 400 that is parallel to the z-axis of the x-y-z frame 412. A fourth distance defines a length of first pentagon segment 504 that is measured between the base edge and the peak of first pentagon segment 504 parallel to the x-axis of the x-y-z frame 412.

Triangle segment 506 has a shape described by an isosceles triangle that extends from channel segment 505. A peak of triangle segment 506 is opposite a triangle base edge. The triangle base edge of triangle segment 506 is mounted near an edge of first face 401 of antenna dielectric layer 400 that is parallel to the x-axis of the x-y-z frame 412 and on an opposite side of first pentagon segment 504 relative to first long bar segment 502.

Channel segment 505 extends in a direction that is generally perpendicular to the length direction of first short bar segment 500 and first long bar segment 502. Channel segment 505 extends between the peak of first pentagon segment 504 and the peak of triangle segment 506. Channel segment 505 has a length measured parallel to the x-axis of the x-y-z frame 412, and a width measured parallel to the z-axis of the x-y-z frame 412.

In the illustrative embodiment, second conducting pattern layer 403 may include a second short bar segment 510, a second long bar segment 512, and a second pentagon segment 514. First short bar segment 500 is a mirror image of second short bar segment 510 through antenna dielectric layer 400. First long bar segment 502 is a mirror image of second long bar segment 512 through antenna dielectric layer 400. Second long bar segment 512 is mounted closer to second pentagon segment 514 than second short bar segment 510. Second pentagon segment 514 is a mirror image of first pentagon segment 504 through antenna dielectric layer 400 except that second pentagon segment 514 is rotated 180° relative to the peak of first pentagon segment 504.

In the illustrative embodiment, an interconnect line 408 is connected between second pentagon segment 514 and ground plane 404. Interconnect line 408 extends from an edge of second pentagon segment 514 that includes one of the adjacent right angles. In alternative embodiments, interconnect line 408 may be connected between first pentagon segment 504 and ground plane 404 or may not be included. Additionally, depending on a bias scheme a capacitor may be used between interconnect line 408 and ground plane 404.

Antenna-reflector line 106 is connected between the peak of second pentagon segment 514 and I/O port 108 of reflecting circuit 104. Interconnect line 408 and antenna-reflector line 106 extend generally parallel to each other. Antenna-reflector line 106 extends through ground plane 404 and reflector dielectric layer 406.

Interconnect line 408 and antenna-reflector line 106 may be formed of a conductive material such as copper plated steel, silver plated steel, silver plated copper, silver plated copper clad steel, copper, copper clad aluminum, steel, etc. Interconnect line 408 and antenna-reflector line 106 may be generally flat or formed of ridges or bumps. For illustration, interconnect line 408 and antenna-reflector line 106 may be formed of a flexible membrane coated with a conductor. Interconnect line 408 and antenna-reflector line 106 may be formed of the same or different conductive materials. Interconnect line 408 and antenna-reflector line 106 may be formed of the same or different conductive material that that used to form second pentagon segment 514.

A first portion of antenna-reflector line 106 formed on second face 509 of antenna dielectric layer 400 has a first width 516 in the width direction (z-axis of the x-y-z frame 412) and a first length in the length direction (x-axis of the x-y-z frame 412). The first portion of antenna-reflector line 106 is mounted to the peak of second pentagon segment 514. A second portion of antenna-reflector line 106 formed on second face 509 of antenna dielectric layer 400 has a second width 518 in the width direction (z-axis of the x-y-z frame 412) and a second length in the length direction (x-axis of the x-y-z frame 412) that is smaller than the first length of the first portion of antenna-reflector line 106. The second portion of antenna-reflector line 106 extends from the first portion of antenna-reflector line 106 on a side opposite where the first portion of antenna-reflector line 106 is mounted to the peak of second pentagon segment 514. A portion of interconnect line 408 formed on second face 509 of antenna dielectric layer 400 has a first width 520 in the width direction (z-axis of the x-y-z frame 412) and a third length in the length direction (x-axis of the x-y-z frame 412).

In the illustrative embodiment of FIGS. 4, 5A, and 5B, antenna dielectric layer 400 is generally perpendicular to ground plane 404 and reflector dielectric layer 406. In the illustrative embodiment, interconnect line 408 and antenna-reflector line 106 are generally parallel to each other. In the illustrative embodiment of FIGS. 4, 5A, and 5B, antenna-reflector line 106 extends parallel to second face 509 of antenna dielectric layer 400 through the top and bottom surfaces of ground plane 404 and reflector dielectric layer 406.

Interconnect line 408 and antenna-reflector line 106 may be a wire, a trace, a vertical interconnect access, or any other means of direct electrical connection. Antenna-reflector line 106 may be surrounded by a dielectric material where antenna-reflector line 106 extends through ground plane 404.

A top surface of ground plane 404 may be mounted to a bottom surface of reflector dielectric layer 406. Reflecting circuit 104 may be mounted to a top surface of reflector dielectric layer 406 that is opposite the bottom surface of reflector dielectric layer 406.

In the illustrative embodiment, antenna 102 is a dipole antenna with an unbalanced geometry to provide a wideband response and simple design procedure. Antenna 102 may receive a signal from an incident wave with an electric field polarization parallel to the x-axis of x-y-z frame 412 and transfer the received signal to reflecting circuit 104 on antenna-reflector line 106. For a wideband response, antenna 102 provides impedance values with only real values over a wide bandwidth by being matched to a design's characteristic impedance.

An illustrative antenna 102 was designed. Antenna dielectric layer 400 was formed of Rogers 5880 dielectric material with a permittivity of 2.2, a loss tangent of 0.0009, and a thickness of 31 millimeters (mm). First conducting pattern layer 402 and second conducting pattern layer 403 were each formed of a multilayer aluminum nitride material with a permittivity of 8.1, a loss tangent of 0.003, and a thickness of 25 mm. Antenna dielectric layer 400, first conducting pattern layer 402, and second conducting pattern layer 403 were optimized to be matched to 50 Ohms over a wide bandwidth. Optimized dimensional values were $W_a$=15.4 mm, $L_a$=11.5 mm, $W_a$=3 mm, $L_g$=4 mm, $W_g$=6.9 mm, $L_d$=5.55 mm, $d_1$=2.5 mm, $d_2$=1 mm, $W_s$=0.5 mm, $L_{s1}$=6 mm, $L_{s2}$=3 mm, $L_{t1}$=1 mm, $W_{t1}$=5 mm, $L_{t2}$=0.4 mm, $W_{t2}$=2.9 mm, $L_{t3}$=0.2 mm, and $W_{t3}$=1 mm. $W_a$ is a width of antenna dielectric layer 400 in the width direction that is parallel to the z-axis of the x-y-z frame 412. $L_a$ is a length of antenna dielectric layer 400 in the length direction that is parallel to the x-axis of the x-y-z frame 412. $W_a$ is a width of the base edge of first pentagon segment 504 and of second pentagon segment 514 in the width direction that is parallel to the z-axis of the x-y-z frame 412. $L_g$ is a length of the triangle base edge of triangle segment 506 in the length direction that is parallel to the x-axis of the x-y-z frame 412. $W_g$ is a width of the triangle base edge of triangle segment 506 in the width direction that is parallel to the z-axis of the x-y-z frame 412. $L_a$ is the fourth distance measured between the base edge and the peak of first pentagon segment 504. $d_1$ is second distance 507, and $d_2$ is first distance 508. $W_s$ is the width of first short bar segment 500, first long bar segment 502, second short bar segment 510, and second long bar segment 512 in the width direction that is parallel to the z-axis of the x-y-z frame 412. $L_{s1}$ is the length of first long bar segment 502 and second long bar segment 512 in the length direction that is parallel to the x-axis of the x-y-z frame 412. $L_{s2}$ is the length of first short bar segment 500 and second short bar segment 510 in the length direction that is parallel to the x-axis of the x-y-z frame 412. $W_{t1}$ is first width 516, and Lu is the first length in the length direction (x-axis of the x-y-z frame 412) of the first portion of antenna-reflector line 106 formed on second face 509 of antenna dielectric layer 400. $W_{t2}$ is second width 518, and $L_{t2}$ is the second length in the length direction (x-axis of the x-y-z frame 412) of the second portion of antenna-reflector line 106 formed on second face 509 of antenna dielectric layer 400. $W_{t3}$ is a width of channel segment 505 measured parallel to the z-axis of the x-y-z frame 412, and $L_{t3}$ is a length of channel segment 505 measured parallel to the x-axis of the x-y-z frame 412. Interconnect line 408 has dimensions selected for impedance matching. In the designed illustrative antenna 102, interconnect line 408 was not used because antenna 102 was wideband antenna without use of interconnect line 408.

Figure 8:
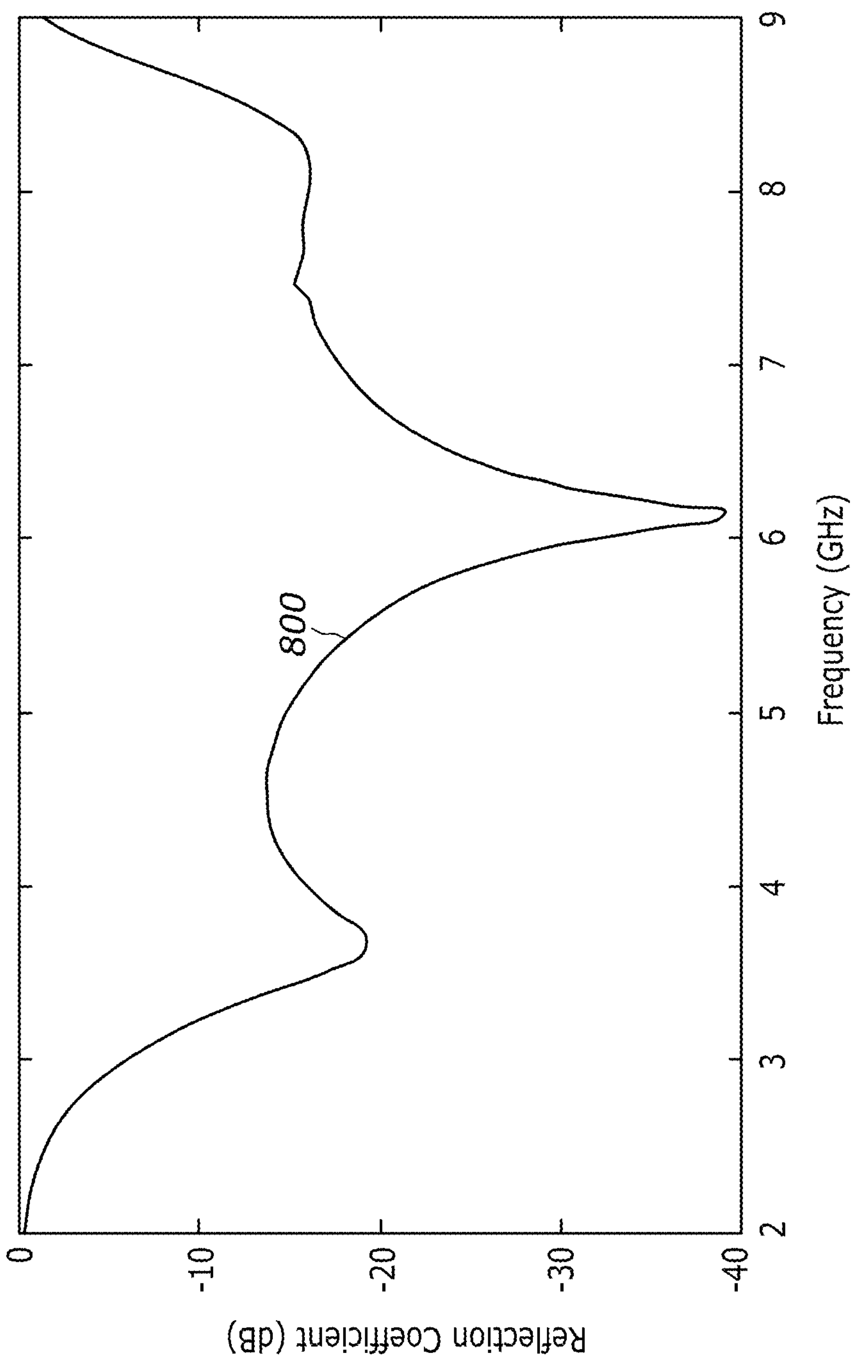
FIG. 8 shows a reflection coefficient as a function of frequency of the dipole antenna of FIG. 4 alone in accordance with an illustrative embodiment.

Referring to FIG. 8, a curve 800 shows a simulated reflection coefficient of antenna 102 designed using the optimized dimensions in accordance with the illustrative embodiment. A reflection coefficient better than-14 decibels (dB) was achieved between 3.4-8.4 gigahertz (GHz).

Figure 6:
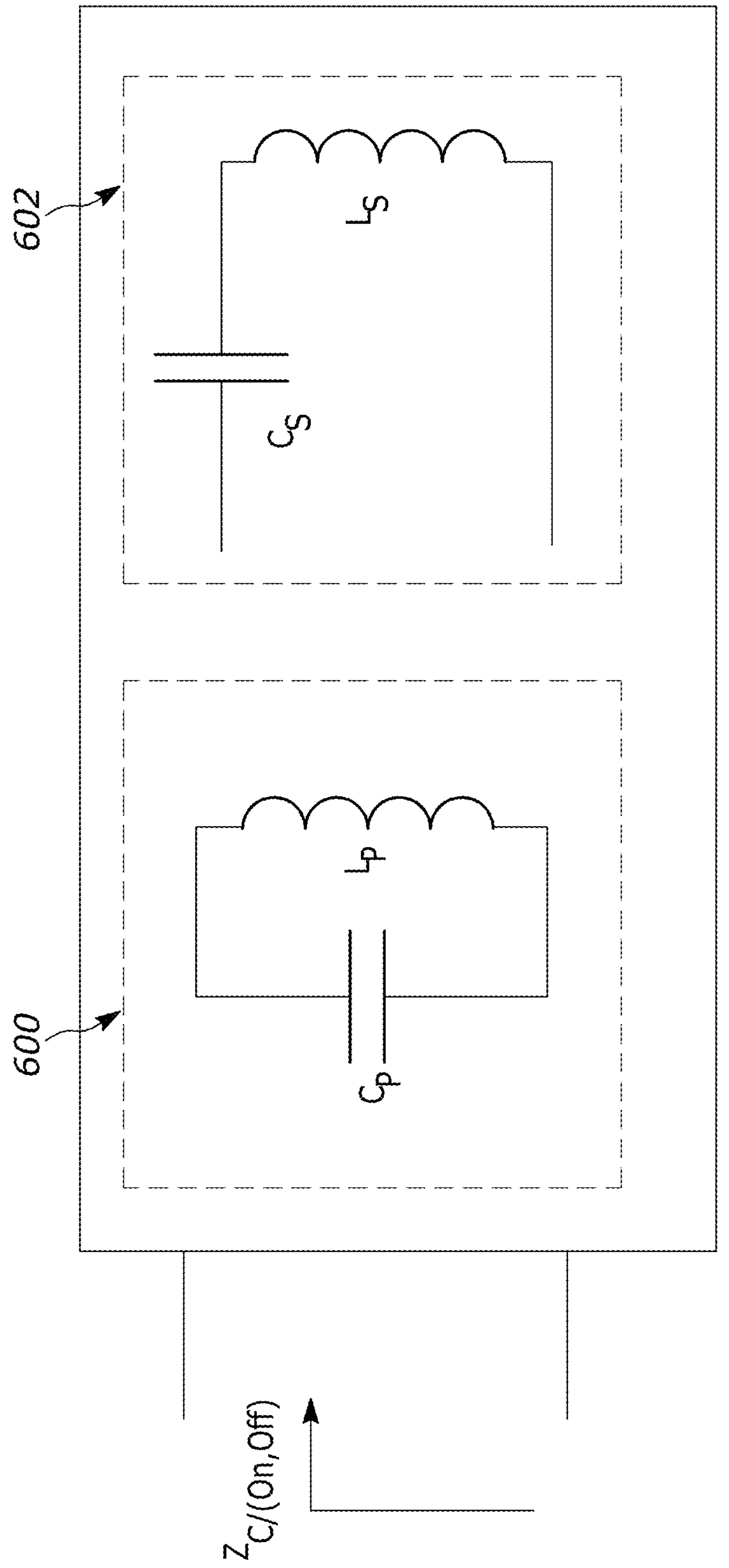
FIG. 6 depicts a circuit diagram of two illustrative equivalent circuits for a 1-bit reflecting circuit of the 1-bit phase shift element of FIG. 1.

Referring to FIG. 6, a first equivalent circuit 600 and a second equivalent circuit 602 for reflecting circuit 104 are shown in accordance with an illustrative embodiment. For illustration, a reflecting circuit impedance $Z_c$ may be defined using first equivalent circuit 600 to define a first mode or a first phase state based on a parallel capacitance value $C_p$ and a parallel inductance value $L_p$. A reflecting circuit impedance $Z_c$ also may be defined using second equivalent circuit 602 to define a second mode or a second phase state based on a series capacitance value Cs, and a series inductance value $L_s$.

Discrete circuit elements, micro-electromechanical systems (MEMS) components, and transmission lines may be used to provide each reflecting circuit impedance $Z_c$ of reflecting circuit 104. The two different phase shifts of 0° and 180° C. an be generated in the reflected signal by controlling a state of a single switch of reflecting circuit 104 that thereby changes the reflecting circuit impedance $Z_c$ of reflecting circuit 104. For example, the state of the switch can be controlled by turning it on or off. The switch may be a single pole, single throw (SPST) switch or other electrical structure such as a positive-intrinsic-negative (PIN) diode that behaves like a SPST switch.

In reflectarrays, a desired phase modulation on the aperture of the reflecting surface is produced by an array of reflecting unit-cells that adjust spatial phase shift in different locations of the aperture to provide beam collimation and beam scanning. The incident wave is coupled to antenna 102 and creates electric/magnetic currents on the surface of antenna 102 resulting in electromagnetic waves induced at a port of antenna 102. By using reflecting circuit 104, which is a reactive topology, the waves received at antenna 102 are reflected back to antenna 102 by reflecting circuit 104 and propagated from the surface of antenna 102 as a plane wave. The reflection coefficient at antenna 102 can be calculated as $$\Gamma_l = |\Gamma_l|e^{j\theta_l} = \frac{Z_c - Z_A^*}{Z_c + Z_A^*},$$

where $\tau_l$ is the reflection of reflecting circuit 104 with magnitude $|\tau_l|$ and phase $\theta_l$, $Z_c$ is the impedance of reflecting circuit 104, and $Z_c$ is the impedance of antenna 102. Reflecting circuit 104 includes passive elements to realize different phase states, thus $Z_c$ can be purely imaginary. To have a high reflection at the second port, the imaginary part of $Z_A$* should be close to zero. In fact, the reflection at the port of antenna 102 is maximized when antenna 102 is designed for real impedance values, and reflecting circuit 104 is designed for imaginary impedance values. Different impedance values for reflecting circuit 104 provide various $\tau_l$ values with different relative phase values.

By using a switch in the structure of reflecting circuit 104, two states with different impedances can be realized. When the switch is ON and OFF, the reflecting circuit provides the impedances of $Z_{C/ON}$ and $Z_{C/OFF}$, respectively that result in two different phase shifts to the reflected wave. These phase states can provide a phase difference of 180° over a certain bandwidth.

Figure 7A:
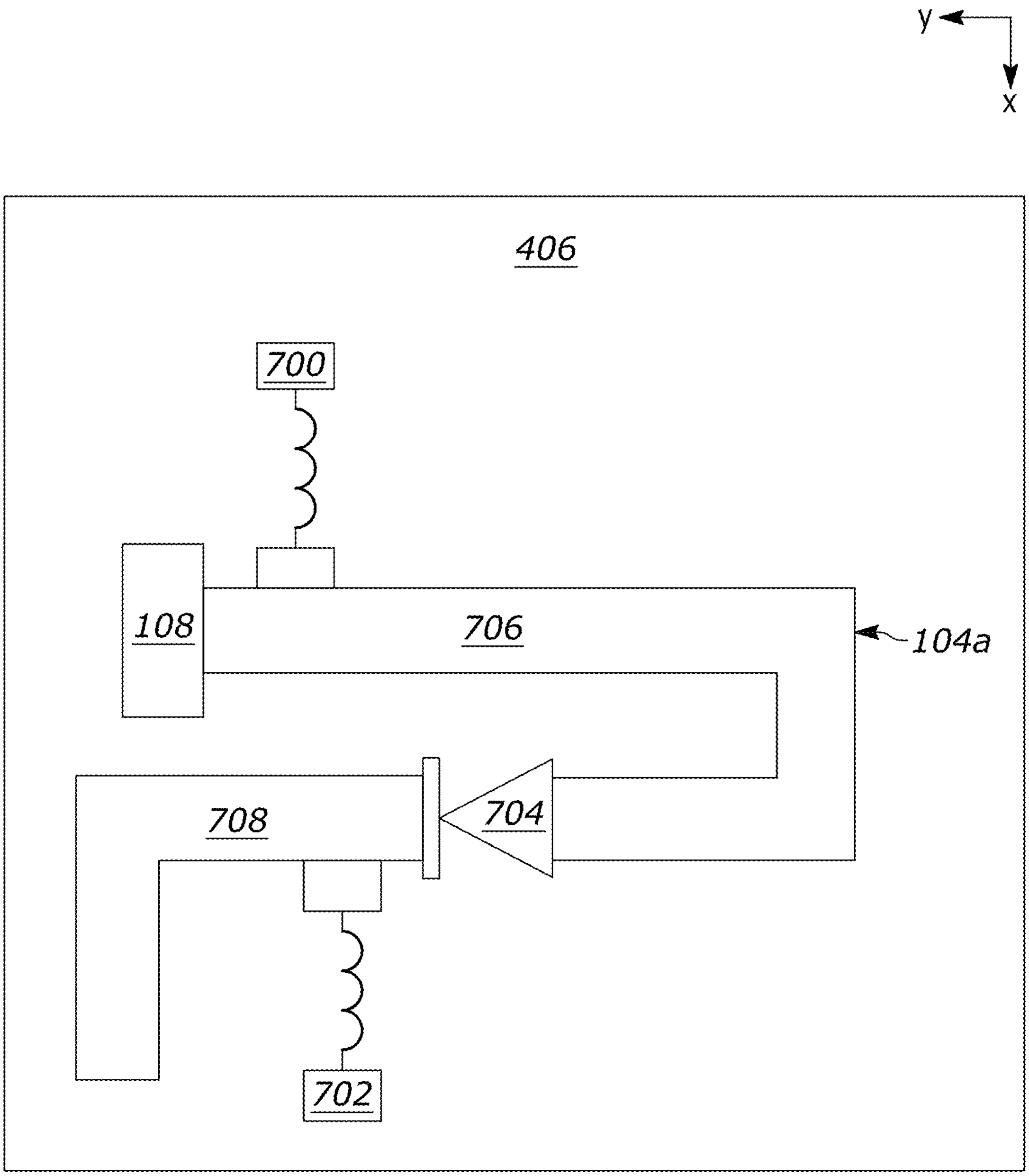
FIG. 7A depicts a first 1-bit reflecting circuit of the 1-bit phase shift element of FIG. 1 on a dielectric layer in accordance with an illustrative embodiment.

Referring to FIG. 7A, a bottom view of reflector dielectric layer 406 to which a first reflecting circuit 104*a* is mounted is shown in accordance with an illustrative embodiment. First reflecting circuit 104*a* can be characterized by first equivalent circuit 600. First reflecting circuit 104*a* may include a first voltage pad 700, a second voltage pad 702, a diode 704, a first line 706, and a second line 708. Voltages applied to first voltage pad 700 and second voltage pad 702 can be controlled to define an on-state (current conducting state) or an off-state (non-current conducting state) of diode 704. First line 706 and second line 708 are sections of transmission line that connect to diode 704. First line 706 and second line 708 are shaped and sized to provide a specific impedance when current flows on a respective line based on a state of diode 704. Through use of diode 704, first line 706 and second line 708 provide a tunable impedance for the reflection load, $Z_{C/ON}$ and $Z_{C/OFF}$, by controlling a flow of current on each line.

In the illustrative embodiment, the signal received by antenna 102 is provided to first reflecting circuit 104*a* at I/O port 108 that is connected to a first end of first line 706. A second end of first line 706 that is opposite the first end is connected to diode 704. A first end of second line 708 is connected to an opposite side of diode 704. First line 706 forms a u-shaped transmission line with a leg that connects to diode 704 that is shorter than an opposite leg of the u-shape. Second line 708 forms an L-shaped transmission line. In the illustrative embodiment, diode 704 is oriented to conduct current in the on-state from first line 706 to second line 708 though it could be oriented to conduct in the opposite direction depending on the voltages applied to first voltage pad 700 and second voltage pad 702 to provide $Z_{C/ON}$ and $Z_{C/OFF}$. First voltage pad 700 is connected to first line 706 through a bias inductance. Second voltage pad 702 is connected to second line 708 through a bias inductance. A leg of second line 708 that connects to diode 704 is parallel to first line 706.

The dimensions and shapes of first line 706 and second line 708 are selected to define a specific impedance value based on the frequency of operation of transceiver system 200. A transmission line has well-defined characteristics and is not simply a conductive wire, the length of which can be ignored by assuming the same alternating current voltage along the entire conductive wire at a given time. As understood by a person of skill in the art, a transmission line can be modeled as an inductor-capacitor (LC) ladder network based on its physical dimensions and shape relative to a frequency of operation of transceiver system 200.

In a first phase state that achieves a phase shift of 0°, the signal enters at I/O port 108 and propagates along first line 706 until the signal reaches diode 704 that is in the off-state such that the current flow is reflected. First reflecting circuit 104*a* provides an open circuit when the signal reaches diode 704 and reflects substantially all of the signal back towards I/O port 108. The reflection phase may be determined by approximately twice a length of first line 706.

In the second phase state that achieves a phase shift of 180°, the signal enters at I/O port 108 and propagates along first line 706 and second line 708 until the signal reaches the end of second line 708 such that the current flow is reflected. First reflecting circuit 104*a* provides an open circuit when the signal reaches the end of second line 708 and reflects substantially all of the signal back towards I/O port 108. The reflection phase may be determined by approximately twice a length of first line 706 and second line 708.

Figure 7B:
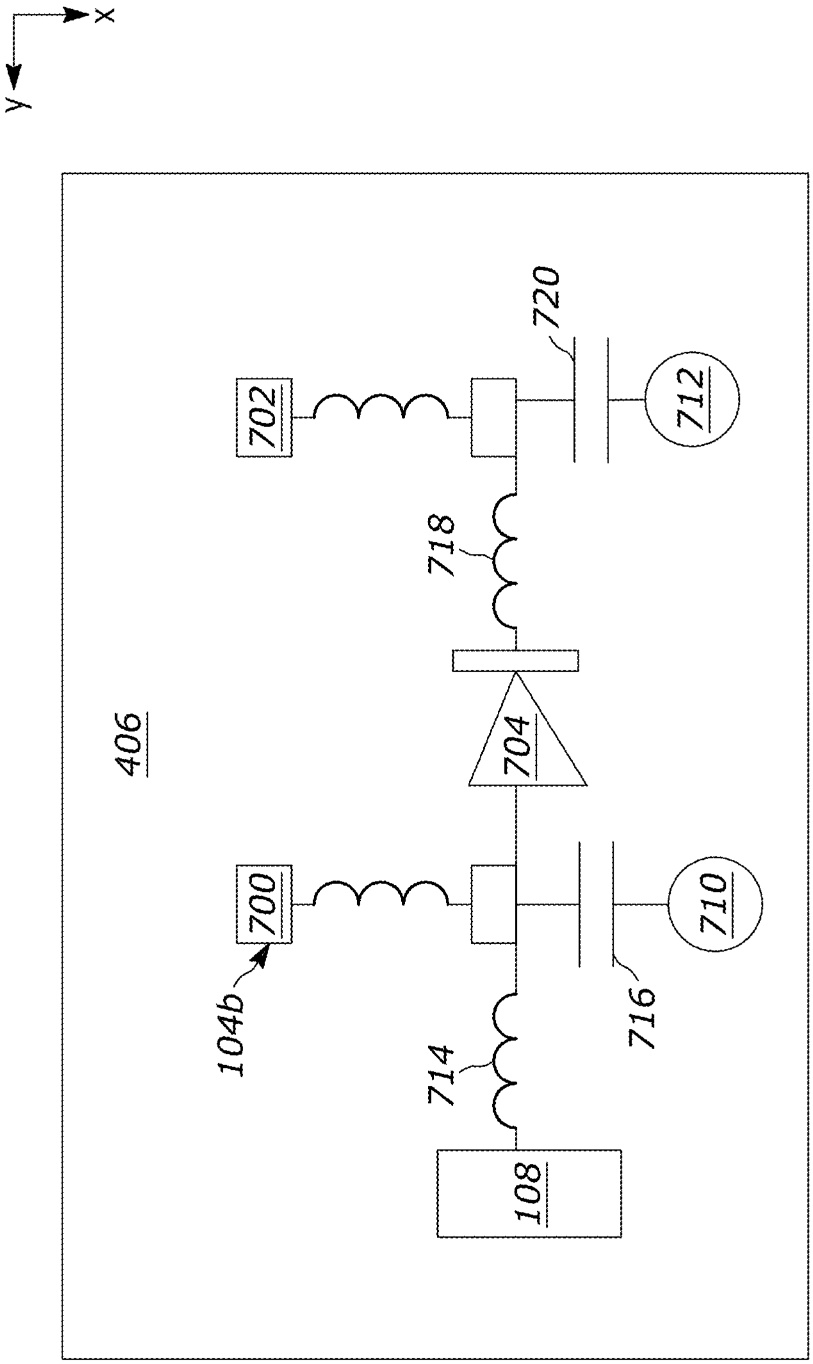
FIG. 7B depicts a second 1-bit reflecting circuit of the 1-bit phase shift element of FIG. 1 on a dielectric layer in accordance with an illustrative embodiment.

Referring to FIG. 7B, a bottom view of reflector dielectric layer 406 to which a second reflecting circuit 104*b* is mounted is shown in accordance with an illustrative embodiment. Second reflecting circuit 104*b* uses lumped inductors and lumped capacitors to realize first equivalent circuit 600. 1-bit phase shift element 100 may be modified to replace first reflecting circuit 104*a* with second reflecting circuit 104*b*.

Second reflecting circuit 104*b* may include first voltage pad 700, second voltage pad 702, diode 704, a first via 710, a second via 712, a first inductor 714, a first capacitor 716, a second inductor 718, and a second capacitor 720. Again, voltages applied to first voltage pad 700 and second voltage pad 702 can be controlled to define an on-state (current conducting state) or an off-state (non-current conducting state) of diode 704. First via 710 is connected between ground plane 404 and a first end of first capacitor 716. Second via 712 is connected between ground plane 404 and a first end of second capacitor 720. I/O port 108 is connected to a first end of first inductor 714. A second end of first inductor 714 is connected to first voltage pad 700, to a second end of first capacitor 716, and to an anode of diode 704. A first end of second inductor 718 is connected to a cathode of diode 704. A second end of second inductor 718 is connected to second voltage pad 702 and to a second end of second capacitor 720. Diode 704 is oriented to conduct current in the on-state from first inductor 714 to second inductor 718.

The signal received by antenna 102 is provided to second reflecting circuit 104*b* at I/O port 108 that is connected to the first end of first inductor 714. When diode 704 is off or in a non-conducting state based on voltages applied to first voltage pad 700 and second voltage pad 702, the received signal is reflected with an impedance defined by the series connection of first inductor 714 and first capacitor 716. When diode 704 is on or in a conducting state based on voltages applied to first voltage pad 700 and second voltage pad 702, the received signal is reflected with an impedance defined by the series connection of first inductor 714 and first capacitor 716 and the series connection of second inductor 718 and second capacitor 720.

Figure 7C:
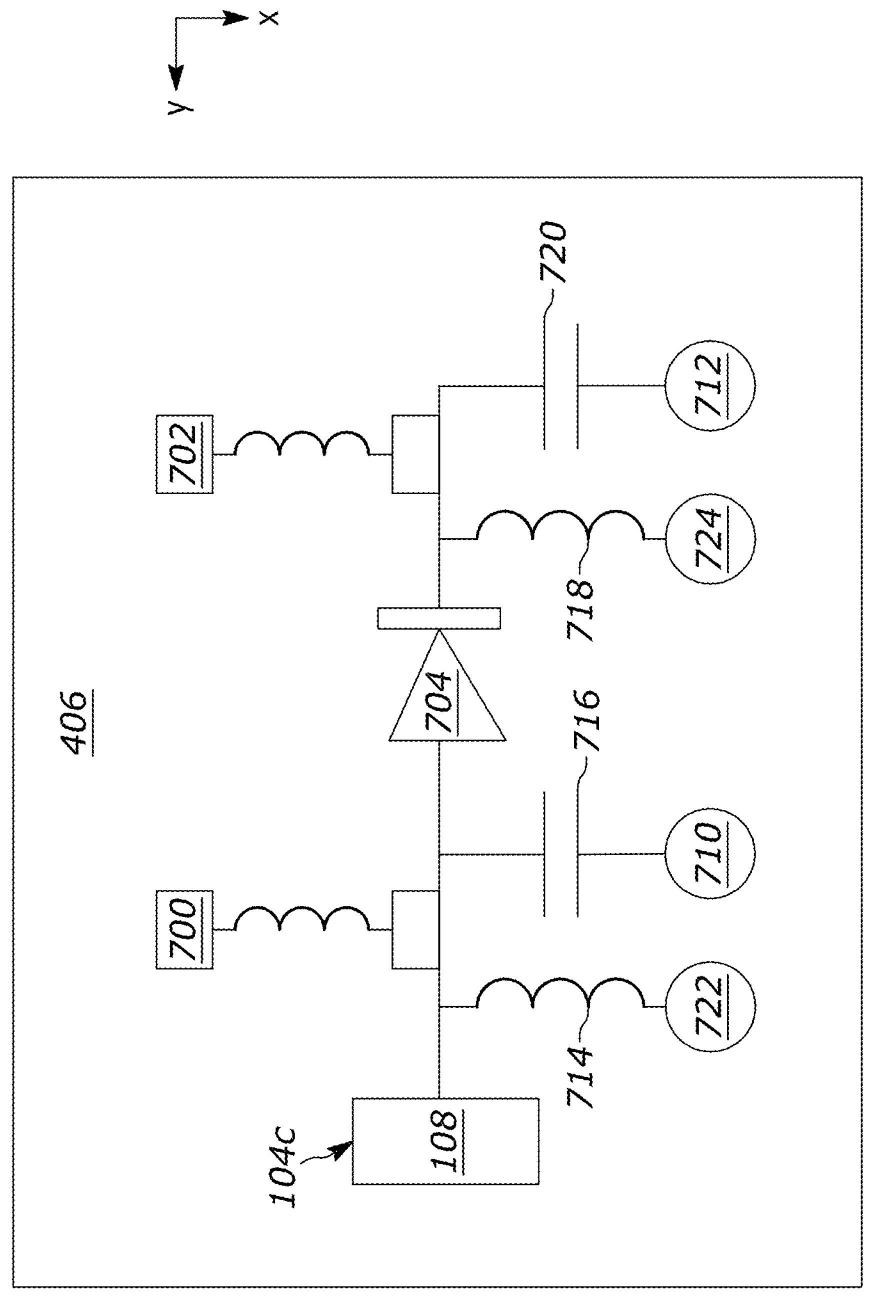
FIG. 7C depicts a third 1-bit reflecting circuit of the 1-bit phase shift element of FIG. 1 on a dielectric layer in accordance with an illustrative embodiment.

Referring to FIG. 7C, a bottom view of reflector dielectric layer 406 to which a third reflecting circuit 104*c* is mounted is shown in accordance with an illustrative embodiment. Third reflecting circuit 104*c* uses lumped inductors and lumped capacitors to realize second equivalent circuit 602. 1-bit phase shift element 100 may be modified to replace first reflecting circuit 104*a* with third reflecting circuit 104*c*.

Third reflecting circuit 104*c* may include first voltage pad 700, second voltage pad 702, diode 704, first via 710, second via 712, a third via 722, a fourth via 724, first inductor 714, first capacitor 716, second inductor 718, and second capacitor 720. Again, voltages applied to first voltage pad 700 and second voltage pad 702 can be controlled to define an on-state (current conducting state) or an off-state (non-current conducting state) of diode 704. Third via 722 is connected between ground plane 404 and the second end of first inductor 714. Fourth via 724 is connected between ground plane 404 and the second end of second inductor 718. I/O port 108 is connected to the first end of first inductor 714, to the second end of first capacitor 716, to first voltage pad 700, and to the anode of diode 704. The first end of second inductor 718 is connected to the cathode of diode 704. The second end of second capacitor 720 is connected to the cathode of diode 704.

The signal received by antenna 102 is provided to second reflecting circuit 104*b* at I/O port 108 that is connected to the first end of first series inductor 714. When diode 704 is off or in a non-conducting state based on voltages applied to first voltage pad 700 and second voltage pad 702, the received signal is reflected with an impedance defined by the parallel connection of first series inductor 714 and first series capacitor 716. When diode 704 is on or in a conducting state based on voltages applied to first voltage pad 700 and second voltage pad 702, the received signal is reflected with an impedance defined by the parallel connection of first series inductor 714 and first series capacitor 716 and the parallel connection of second series inductor 718 and second series capacitor 720.

1-bit phase shift element 100 with first reflecting circuit 104*a* was simulated by Ansys HFSS using the illustrative antenna 102 described above. Diode 704 had a forward resistance of 2.4 Ohm and a reverse capacitance of 0.078 picofarad. 1-bit phase shift element 100 was illuminated by an incident wave with polarization in the x-direction. A width of first line 706 parallel to the x-axis was 0.254 mm, and a length of first line 706 parallel to the y-axis was 7.7 mm. A width of second line 708 parallel to the x-axis was 0.6 mm, and a length of second line 708 parallel to the y-axis was 5.3 mm.

Figure 9:
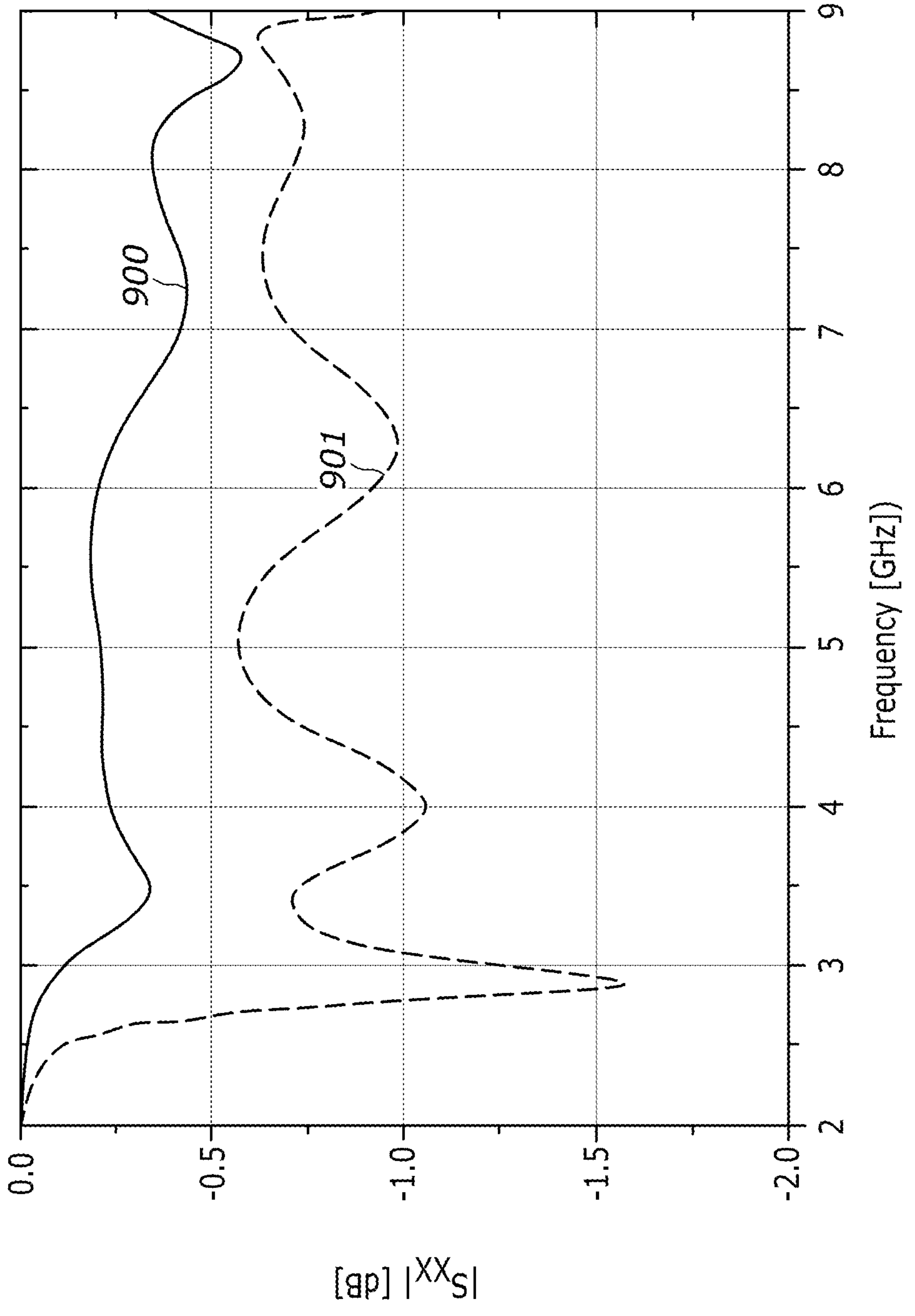
FIG. 9 shows a simulated reflection coefficient as a function of frequency generated in a direction of polarization of an incident wave by the 1-bit phase shift element of FIG. 7A in accordance with an illustrative embodiment.

Referring to FIG. 9, a simulated magnitude of a reflection coefficient in the x-axis direction as a function of frequency is shown for each phase state in accordance with an illustrative embodiment. A first curve 900 shows the reflection coefficient for the first phase state with diode 704 in the non-conducting state. A second curve 901 shows the reflection coefficient for the second phase state with diode 704 in the conducting state. The reflection coefficient in the x-axis direction for both phase states was approximately better than-1.0 dB from 3.1 GHz to 9 GHz.

Figure 10:
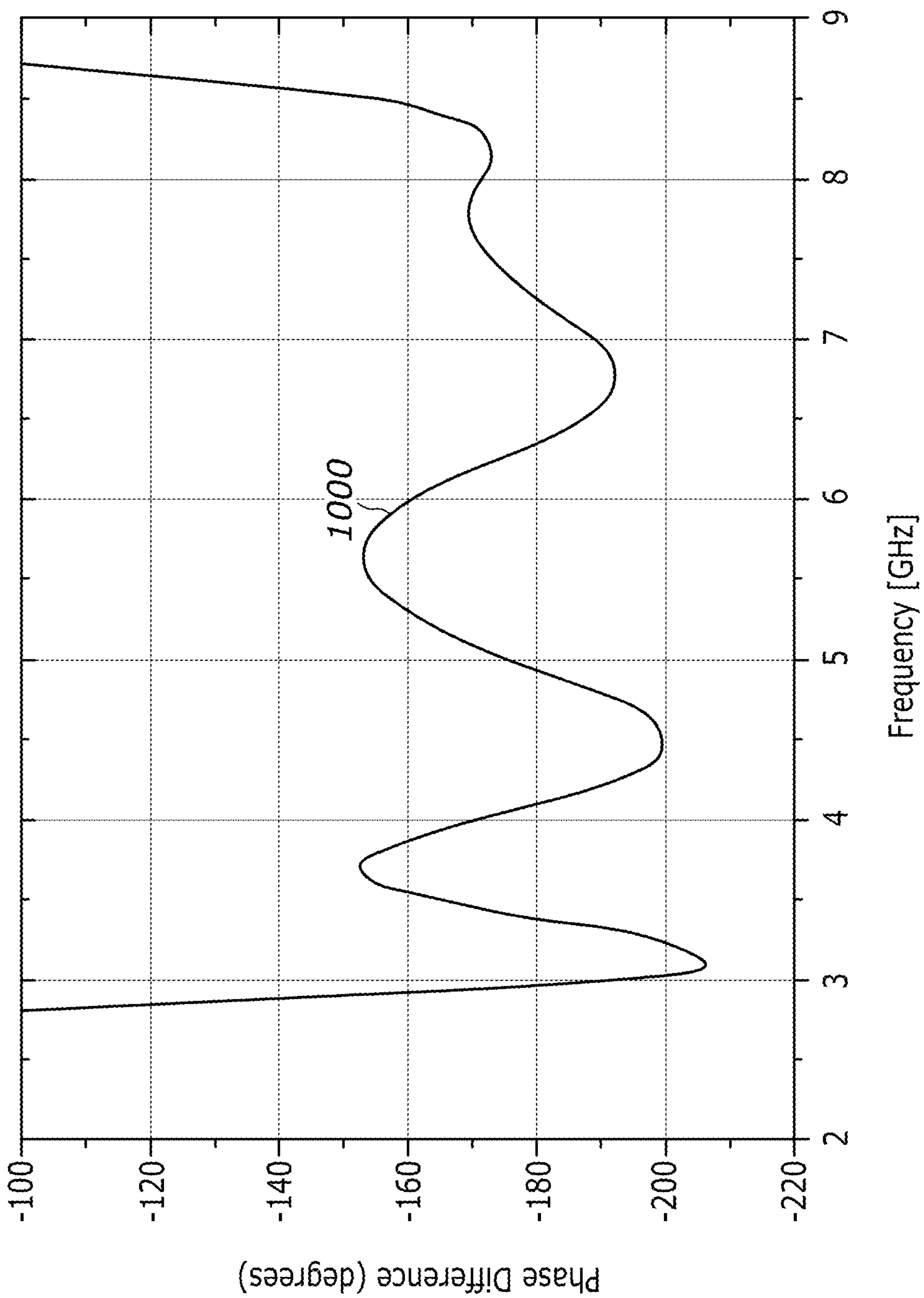
FIG. 10 shows a simulated phase difference as a function of frequency generated by the 1-bit phase shift element of FIG. 7A in accordance with an illustrative embodiment.

Referring to FIG. 10, a simulated phase difference as a function of frequency is shown in accordance with an illustrative embodiment. A phase difference curve 1000 shows a phase difference between the two phase states. The phase difference was approximately 180°±25° from 2.85 to 8.5 GHz demonstrating an operating bandwidth of 2.7:1 (92%) from 3.1 to 8.4 GHZ, where $|\tau_{xx}|<-1$ dB and the phase difference is between 155° and 205°. $\tau_{xx}$ indicates the reflection coefficient when both the incident and reflected waves are in the x-axis direction.

1-bit phase shift element 100 with first reflecting circuit 104*a*, second reflecting circuit 104*b*, and third reflecting circuit 104*c* was also simulated using their respective circuit models using the illustrative embodiment of antenna 102. Diode 704 had a forward resistance of 2.4 Ohm and a reverse capacitance of 0.078 picofarad (pF). 1-bit phase shift element 100 was illuminated by an incident wave with polarization in the x-axis direction. A width of first line 706 parallel to the x-axis was 0.254 mm, and a length of first line 706 parallel to the y-axis was 2.7 mm. A width of second line 708 parallel to the x-axis was 4.5 mm, and a length of second line 708 was 2.7 mm. To achieve a similar impedance using second reflecting circuit 104*b*, first inductor 714 has an inductance value of 0.6 nanohenries (nH), first capacitor 716 has a capacitance value of 0.27 pF, second inductor 718 has an inductance value of 0.78 nH, and second capacitor 720 has a capacitance value of 1.81 pF. To achieve a similar impedance using third reflecting circuit 104*c*, first inductor 714 has an inductance value of 8.8 nH, first capacitor 716 has a capacitance value of 0.2 pF, second inductor 718 has an inductance value of 0.25 nH, and second capacitor 720 has a capacitance value of 1.0 pF.

Figure 11:
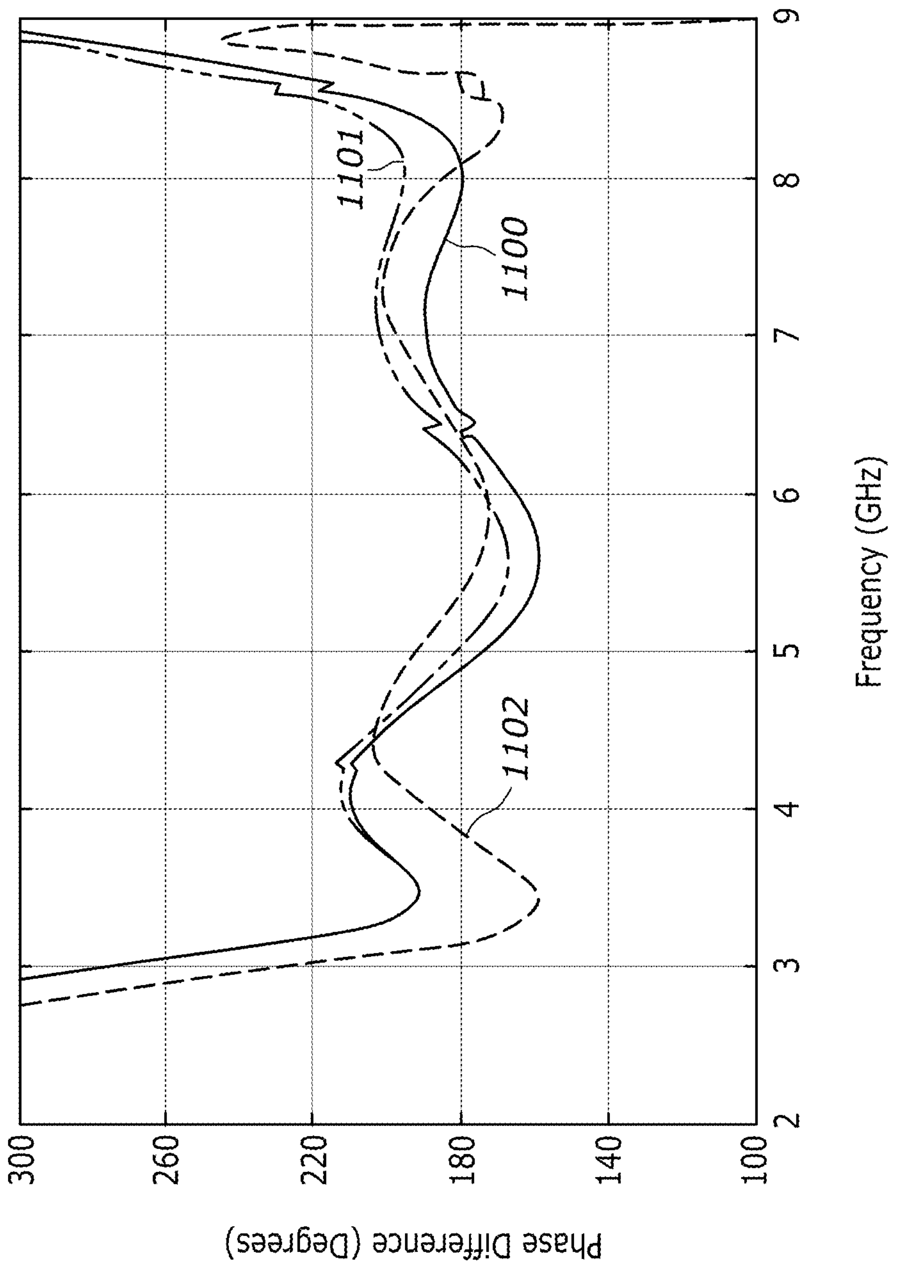
FIG. 11 shows a simulated phase difference between the two states as a function of frequency generated by the 1-bit phase shift elements of FIGS. 7A-7C in accordance with an illustrative embodiment.

Referring to FIG. 11, a simulated phase difference between the two states as a function of frequency is shown in accordance with an illustrative embodiment. A phase difference curve 1100 shows a phase difference between the two phases states using first reflecting circuit 104*a*. A phase difference curve 1101 shows a phase difference between the two phases states using second reflecting circuit 104*b*. A phase difference curve 1102 shows a phase difference between the two phases states using third reflecting circuit 104*c*. All three designs provide a wide bandwidth.

As used herein, the term "mount" includes join, unite, connect, couple, associate, insert, hang, hold, affix, attach, fasten, bind, paste, secure, bolt, screw, rivet, solder, weld, glue, form over, form in, layer, mold, rest on, rest against, etch, abut, and other like terms. The phrases "mounted on", "mounted to", and equivalent phrases indicate any interior or exterior portion of the element referenced. These phrases also encompass direct mounting (in which the referenced elements are in direct contact) and indirect mounting (in which the referenced elements are not in direct contact, but are connected through an intermediate element). Elements referenced as mounted to each other herein may further be integrally formed together, for example, using a molding or a thermoforming process as understood by a person of skill in the art. As a result, elements described herein as being mounted to each other need not be discrete structural elements. The elements may be mounted permanently, removably, or releasably unless specified otherwise.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

Any directional references used herein, such as left-side, right-side, top, bottom, back, front, up, down, above, below, etc., are for illustration only based on the orientation in the drawings selected to describe the illustrative embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A phase shift element comprising:

an antenna;

a first dielectric layer;

a ground plane mounted to a first surface of the first dielectric layer;

a reflecting circuit mounted to a second surface of the first dielectric layer, wherein the first surface is opposite the second surface;

a single antenna-reflector line connected between the antenna and the reflecting circuit through the ground plane and the first dielectric layer, wherein the antenna-reflector line is formed of a conducting material; and an interconnect line connected between the antenna and the ground plane, wherein the interconnect line is formed of a conducting material, wherein the reflecting circuit is configured to reflect a signal received on the single antenna-reflector line from the antenna back to the antenna on the single antenna-reflector line; and wherein the reflecting circuit is further configured to be switchable between two different impedance levels that each provide a different phase shift when the signal is reflected by the reflecting circuit.

2. The phase shift element of claim 1, wherein the antenna is a dipole antenna with an unbalanced geometry.

3. The phase shift element of claim 1, wherein the antenna is a dipole antenna.

4. The phase shift element of claim 3, wherein the dipole antenna comprises:

a second dielectric layer;

a first conducting pattern mounted on a first surface of the second dielectric layer; and a second conducting pattern mounted on a second surface of the second dielectric layer that is opposite to the first surface of the second dielectric layer.

5. The phase shift element of claim 4, wherein the single antenna-reflector line is connected between the second conducting pattern and the reflecting circuit through the ground plane and the first dielectric layer.

6. The phase shift element of claim 5, further comprising an interconnect line connected between the second conducting pattern and the ground plane, wherein the interconnect line is formed at least partially on the second surface of the second dielectric layer, wherein the interconnect line is formed of a conducting material.

7. The phase shift element of claim 4, wherein a first plane defined by the first surface of the second dielectric layer is perpendicular to a second plane defined by the first surface of the first dielectric layer.

8. The phase shift element of claim 4, wherein a first plane defined by the first surface of the second dielectric layer is perpendicular to a second plane defined by the first surface of the first dielectric layer and to a second plane defined by the first surface of the ground plane.

9. The phase shift element of claim 4, wherein the first conducting pattern and the second conducting pattern are different.

10. The phase shift element of claim 1, wherein the reflecting circuit comprises:

a first transmission line section;

a second transmission line section; and a switch connected between the first transmission line section and the second transmission line section, wherein the two different impedance levels are defined based on a conducting or a non-conducting state of the switch.

11. The phase shift element of claim 10, wherein the switch is a diode.

12. The phase shift element of claim 11, wherein the reflecting circuit further comprises:

a first voltage pad connected to the first transmission line section; and a second voltage pad connected to the second transmission line section, wherein a difference between voltages applied to the first voltage pad and the second voltage pad controls a state of the diode to connect the first transmission line section and the second transmission line section.

13. The phase shift element of claim 11, wherein the first transmission line section forms a U-shape.

14. The phase shift element of claim 13, wherein the second transmission line section forms an L-shape.

15. The phase shift element of claim 1, wherein the reflecting circuit comprises:

a first inductor;

a first capacitor connected in series with the first inductor;

a second inductor;

a second capacitor connected in series with the second inductor; and a switch connected in series between the first inductor and the second inductor, wherein the two different impedance levels are defined based on a conducting or a non-conducting state of the switch.

16. The phase shift element of claim 15, wherein the switch is a diode, and wherein the reflecting circuit further comprises:

a first voltage pad connected between the first inductor and an anode of the diode; and a second voltage pad connected between the second inductor and the second capacitor, wherein a difference between voltages applied to the first voltage pad and the second voltage pad controls a state of the diode to connect the first inductor and the second inductor.

17. The phase shift element of claim 1, wherein the reflecting circuit comprises:

a first inductor;

a first capacitor connected in parallel with the first inductor;

a second inductor;

a second capacitor connected in parallel with the second inductor; and a switch connected in series between the first capacitor and the second inductor, wherein the two different impedance levels are defined based on a conducting or a non-conducting state of the switch.

18. The phase shift element of claim 17, wherein the switch is a diode, and wherein the reflecting circuit further comprises:

a first voltage pad connected between the first inductor and the first capacitor; and a second voltage pad connected between the second inductor and the second capacitor, wherein a difference between voltages applied to the first voltage pad and the second voltage pad controls a state of the diode to connect the first capacitor and the second inductor.

19. A phased array antenna comprising:

a plurality of phase shift elements, wherein each phase shift element of the plurality of phase shift elements comprises:

an antenna;

a first dielectric layer;

a ground plane mounted to a first surface of the first dielectric layer;

a reflecting circuit mounted to a second surface of the first dielectric layer, wherein the first surface is opposite the second surface;

a single antenna-reflector line connected between the antenna and the reflecting circuit through the ground plane and the first dielectric layer, wherein the antenna-reflector line is formed of a conducting material; and an interconnect line connected between the antenna and the ground plane, wherein the interconnect line is formed of a conducting material, wherein the reflecting circuit is configured to reflect a signal received on the single antenna-reflector line from the antenna back to the antenna on the single antenna-reflector line; and wherein the reflecting circuit is further configured to be switchable between two different impedance levels that each provide a different phase shift when the signal is reflected by the reflecting circuit.

* * * * *